United States Patent [19]
Abe et al.

[11] Patent Number: 5,274,679
[45] Date of Patent: Dec. 28, 1993

[54] HARDWARE ARRANGEMENT FOR SPECIFYING DATA FORMAT IN ASYNCHRONOUS TRANSMISSION

[75] Inventors: Toshio Abe, Tokyo; Shinichi Aoki, Shizuoka, both of Japan

[73] Assignee: NEC Corporation, Tokyo, Japan

[21] Appl. No.: 881,779

[22] Filed: May 11, 1992

[30] Foreign Application Priority Data

May 10, 1991 [JP] Japan .................. 3-105835

[51] Int. Cl.⁵ ............................. H04L 25/38
[52] U.S. Cl. .................. 375/117; 370/48; 358/413
[58] Field of Search .......... 375/114, 116, 117; 370/48; 358/413

[56] References Cited

U.S. PATENT DOCUMENTS

| | | | |
|---|---|---|---|
| 4,017,683 | 4/1977 | Pederson et al. | 375/117 |
| 4,414,677 | 11/1983 | Ive et al. | 375/116 |
| 4,761,800 | 8/1988 | Lese et al. | 375/117 |
| 4,792,966 | 12/1988 | Ballweg | 375/117 |

Primary Examiner—Curtis Kuntz
Assistant Examiner—Young Tse
Attorney, Agent, or Firm—Whitham & Marhoefer

[57] ABSTRACT

In order to detect the format of asynchronously, serially transmitted character data using a command signal which includes a plurality of command character data, wherein the beginning of each of the command character data is identified by a start bit, and the character length of each of the character signals is L (a positive integer), the start bit is detected and a train of pulses generated to enable each of the character data to be sampled; the character signal is sampled and converted into a corresponding parallel signal; each of the parallel character signals outputted are ascertained; the number of character data received is counted and it is determined if a predetermined matching is achieved.

7 Claims, 4 Drawing Sheets

FIG. 4

BIT COMBINATION NO.

| | BIT COMBINATION | | | | DATA FORMAT | | |
|---|---|---|---|---|---|---|---|
| | $B10''$ | $B9''$ | $B10'$ | $B9'$ | DATA BIT LENGTH | PARITY | STOP BIT LENGTH |
| 1 | 0 | 0 | 0 | 0 | 8 | SPACE (0) | 1 |
| 2 | 0 | 0 | 1 | 0 | 8 | ODD | 1 |
| 3 | 1 | 0 | 0 | 0 | 8 | EVEN | 1 |
| 4 | 1 | 0 | 1 | 0 | 8<br>8<br>7 | MARK (1)<br>NONE<br>SPACE (0) | 1<br>2<br>2 |
| 5 | 1 | 0 | 1 | 1 | 7 | ODD | 2 |
| 6 | 1 | 1 | 1 | 0 | 7 | EVEN | 2 |
| 7 | 1 | 1 | 1 | 1 | 7 | MARK (1) | 2 |
| 8 | 0 | 0 | 0 | 1 | IMPOSSIBLE BIT COMBINATIONS | | |
| 9 | 0 | 0 | 1 | 1 | | | |
| 10 | 0 | 1 | 0 | 0 | | | |
| 11 | 0 | 1 | 0 | 1 | | | |
| 12 | 0 | 1 | 1 | 0 | | | |
| 13 | 0 | 1 | 1 | 1 | | | |
| 14 | 1 | 0 | 0 | 1 | | | |
| 15 | 1 | 1 | 0 | 0 | | | |
| 16 | 1 | 1 | 0 | 1 | | | |

HARDWARE ARRANGEMENT FOR SPECIFYING DATA FORMAT IN ASYNCHRONOUS TRANSMISSION

BACKGROUND OF THE INVENTION

1. Field of the Invention

The present invention relates to a hardware arrangement for producing bit combinations by which binary data formats are specified in an asynchronous transmission, and more specifically to such an arrangement which is provided in data circuit-terminating equipment (DCE) for ascertaining the format of data transmitted between the DCE and a data terminating equipment (DTE).

2. Description of the Prior Art

With conventional analog telephony, a modem is a device which takes a digital data do (direct-current) signal and renders it compatible with a standard telephone voice channel.

The modem or digital conditioning device is referred to as data circuit-terminating equipment (DCE). This equipment is provided between user data terminal equipment (DTE) and the telephone voice channel.

As an extended command for automatic calling in CCITT recommendation V.25 bis, a so called SET command may be used in asynchronous transmission. The SET command is comprised of three characters SET plus a control code CR (carriage return). In such an asynchronous transmission between the DCE and the DTE, the SET command is used to detect a format of the data to be transmitted. After detecting the data format, data transmission is implemented using the detected data format.

In such an asynchronous transmission using the SET command, data format is detected using a serial interface LSI (large scaled integration) which is controlled by a software operated CPU (central processing unit).

However, as the data transmission rate increases, the above mentioned software based data format detection is unable to correctly receive the data which immediately follows the SET command.

SUMMARY OF THE INVENTION

It is an object of the present invention to provide a hardware arrangement by which a data format can be rapidly detected in an asynchronous transmission.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 4 is a table showing a plurality of bit combinations and data formats specified thereby.

DETAILED DESCRIPTION OF THE PREFERRED EMBODIMENTS

One preferred embodiment of the present invention will be discussed with reference to FIGS. 1-4.

Figure 1:
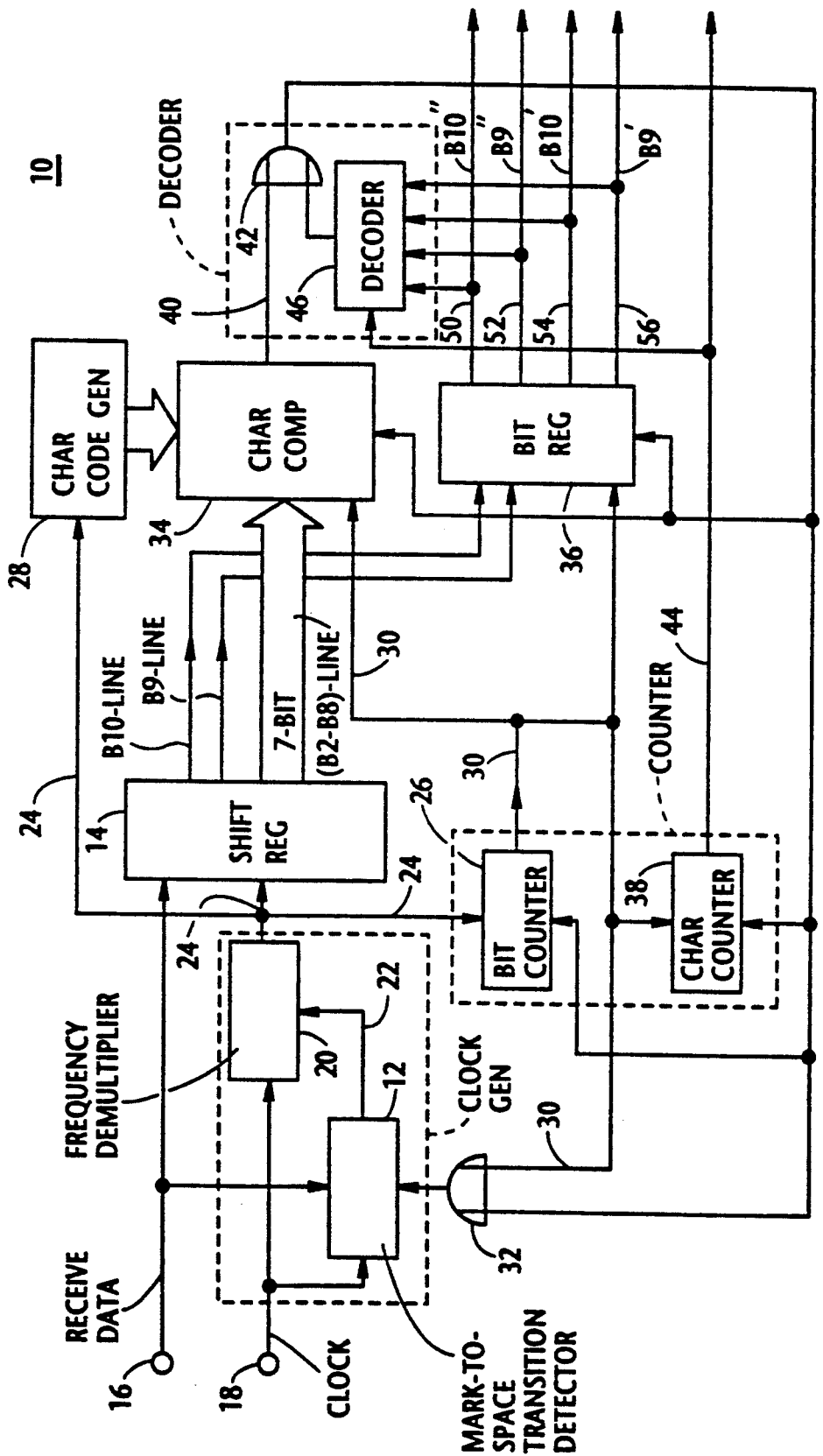
FIG. 1 is a block diagram showing an arrangement of the present invention.

FIG. 1 is a block diagram showing an arrangement of the present invention which is provided in a DCE (data circuit-terminating equipment). The FIG. 1 arrangement, denoted by numeral 10, is configured to acquire a command signal applied from a DTE (data terminal equipment) and then issue bit combinations for use in detecting data format. In more specific terms, the FIG. 1 arrangement is provided in addition to a conventional data processing circuit provided in the DCE, and receives the command signal involved in the data to be applied to the above mentioned conventional data processing circuit. In other words, the arrangement shown in FIG. 1 is always supplied with the same data as the conventional circuit receives, however, once a data format is specified, the FIG. 1 arrangement ignores the data which follows the command signal until the next data format detection is required.

It is assumed that a command signal applied to the FIG. 1 arrangement is comprised of three character codes "S", "E", "T" in this order and one control code "CR" (viz., Carriage Return) preceded thereby.

Figure 2:
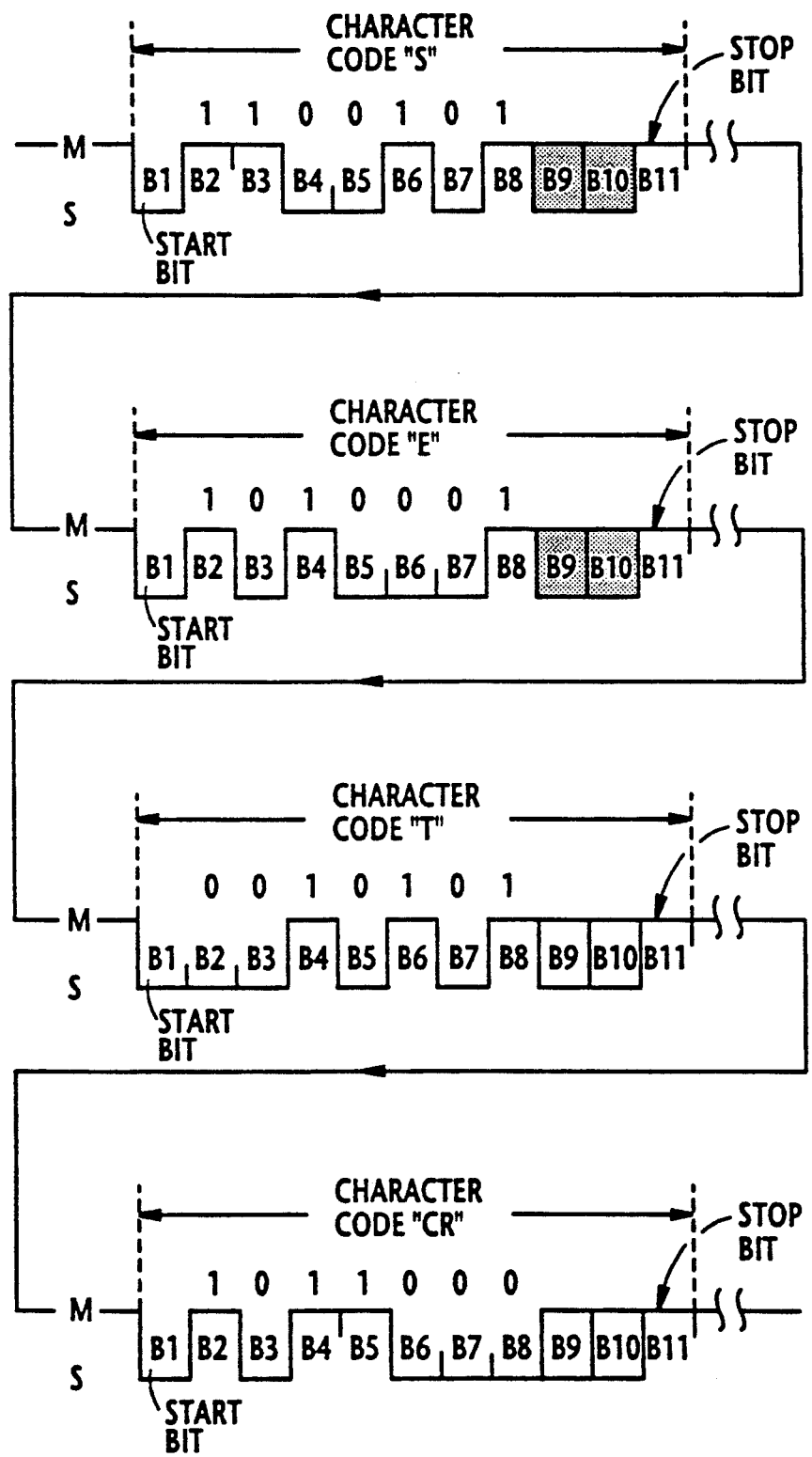
FIG. 2 is a diagram which schematically shows character and control code formats used in a set command utilized by the circuit arrangement shown in FIG. 1.

FIG. 2 is a diagram which schematically shows the character and control code formats of the above mentioned set command (viz., S-E-T-CR). As shown in FIG. 2, the character length is 11-bit in this particular case. Each of first bits B1 is a start bit and each of 11th bits B11 is a stop bit.

In an asynchronous (viz., start-stop) transmission, bits (viz., information signal elements) are each of the same duration, which is the duration or pulse width of the start bit. A stop bit has an indefinite or pulse width beyond a certain minimum, and is used to indicate the end of a transmitted code. However, in this embodiment, the stop bit B11 has the same duration as the start bit B1 as illustrated.

Before describing the operations of the FIG. 1 arrangement, it is deemed preferable to discuss possible data formats in the start-stop transmission with reference to FIG. 4.

It is known that ASCII is a 7-bit code providing 128 possible character combinations, the first 32 codes of which are used for printing and transmission control. Since the common storage unit is an 8-bit byte (256 combinations) and ASCII uses only 128, the extra one bit may be used to hold special symbols such as foreign language characters and graphics symbols. The firstly mentioned 128 codes (0-127) characters are called Standard ASCII, while the additional 128 codes (128-255) are referred to as Extended ASCII. In brief, there are two basic data formats one of which exhibits a 7-bit data and the other a 8-bit data as shown in FIG. 4.

Further, as shown in FIG. 4, in the start-stop transmission, there are four kinds of parity, viz., even parity, odd parity, mark parity and space parity. The mark parity implies the parity bit is fixed to a mark (viz., a logic level 1). Similarly, the space parity means that a parity bit is fixed to a space (viz., logic level 0).

Still further, the stop bit length may take one or two bits as shown in FIG. 4.

Accordingly, it is understood that each of the bits B9, B10 is assigned to one of data bit, a parity bit or a stop bit as illustrated in FIG. 4. Therefore, the bit status of each of B9, B10 depends on a data (viz., character)

format and thus it is necessary to specify the data format employed in a data transmission between the DCE and the DTE prior to actual data transmissions.

Returning to FIG. 1, it is assumed that the ASCII code "S" is applied to a mark-to-space transition detector 12 and also to a shift register (serial/parallel converter) 14 both via an input terminal 16. With start-stop system a character begins with a mark-to-space transition at the beginning of the start bit. A clock pulses, whose clock rate is much faster than the transmission speed of data inputted to the input terminal 16, is applied, via an input terminal 18, to the mark-to-space transition detector 12 and also to a frequency demultiplier 20.

Figure 3:
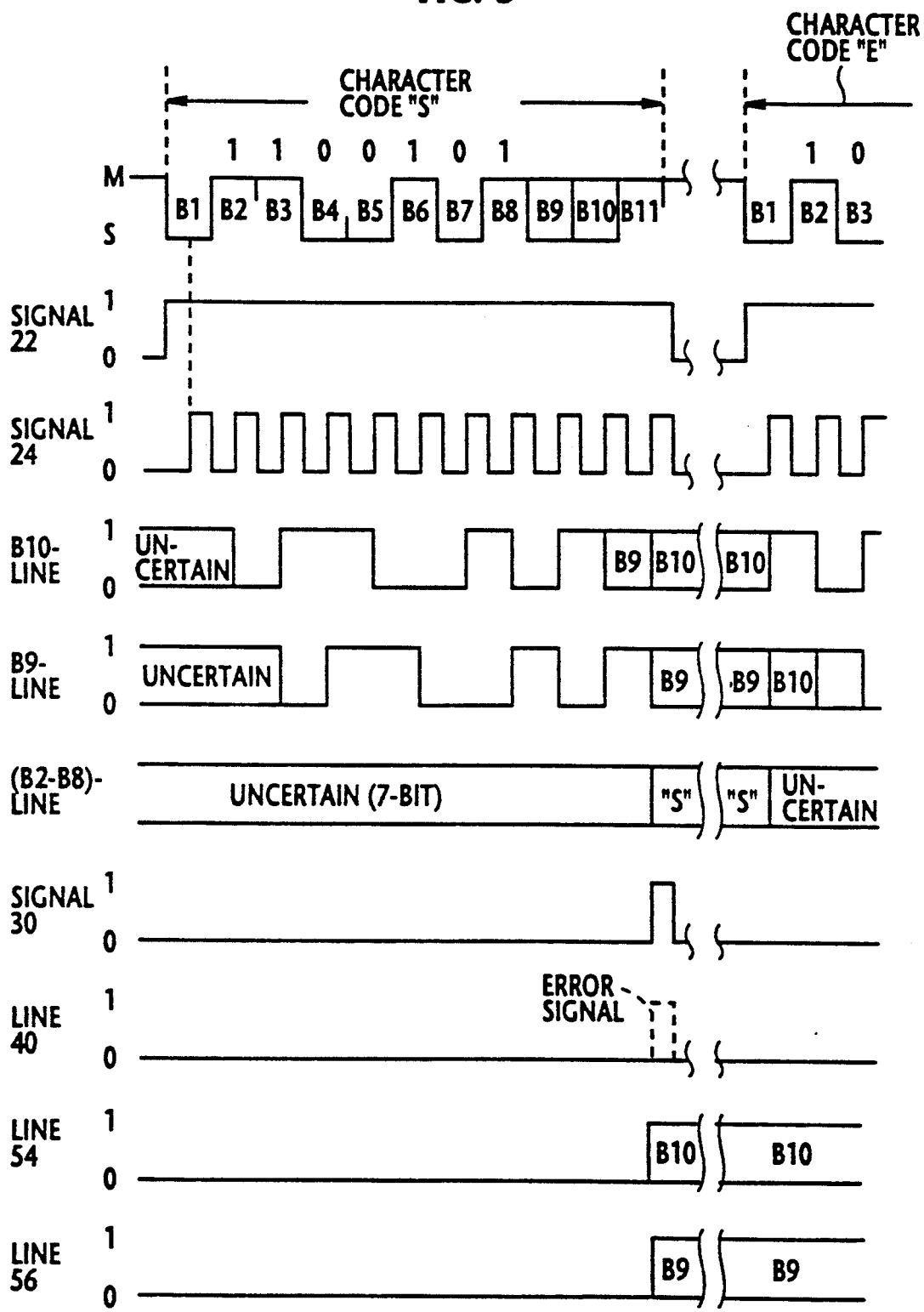
FIG. 3 is timing charts for discussing the operations of the FIG. 1 arrangement.

In the event that the detector 12 detects a mark-to-space transition at the beginning of the start bit B1 (FIGS. 2, 3), the detector 12 supplies the frequency demultiplier 20 with a start bit detection signal 22 (see FIG. 3). The frequency demultiplier 20 is responsive to the issuance of the signal 22 and produces a train of pulses 24 (FIG. 3) for use in acquisition of the character "S". The train of pulses 24 is applied to the shift register 14, a bit counter 26 and a character code generator 28. It should be noted that a leading edge of each of the pulses 24 is positioned at the center of each bit data in order to assure an accurate data acquisition.

The shift register 14 is arranged to sample or acquire the bit sequence (viz., character "S" in this instance) and converts same into the corresponding parallel bits in synchronism with the pulses 24. The shift register 14 is provided with 9 output lines, viz., a (B2-B8)-line, a B9-line and a B10-line as shown in FIG. 1. On the other hand, the bit counter 26 counts the number of pulses 24 and generates a character receive completion signal 30 upon counting up to eleven.

The signal 30 is applied to the mark-to-space transition detector 12 via an OR gate 32 and initialize the detector. The signal 30 is further fed to a character comparator 34, a bit register 36 and a character counter 38. When the signal 30 issues, the 7-bit data appearing at the (B2-B8)-line exhibits the character "S" (viz., 1100101) in this case. The character comparator 34 is responsive to the signal 30 and compares the 7-bit data applied from the shift register 14 with a code "S" applied from the character code generator 28. The character code generator 28 is previously arranged to apply the codes "S", "E", "T" and "CR" when each code is required at the comparator 34.

In the event that the comparator 34 fails to ascertain the coincidence, the comparator 34 issues an error signal ERROR over a line 40 as shown in FIG. 3. The error signal ERROR is applied, via an OR gate 42, to the blocks 12, 26, 34, 36 and 38 for resetting them.

On the other hand, if the comparator 34 detects that the 7-bit data from the shift register 14 coincides with the character applied from the code generator 28, the comparator 34 issues no error signal. Thus, the bit register 36 acquires thereinto the two bits B9 and B10 of the character "S" which are applied via the B9-line and the B10-line. The bits B9 and B10 stored in the bit register 36, appear respectively at output lines 56, 54 of the register 36 as shown in FIG. 3.

After the completion of the above mentioned operations, the next ASCII code "E" is applied to the FIG. 1 arrangement via the input terminal 16. The following operations in connection with the code "E" are identical with those as mentioned above, and hence same discussions will be omitted for the sake of brevity. However, in this instance, the bit register 36 stores the two bits B9 and B10 of the character "E" which appear over output lines 52, 54 of the register 36 (not shown in FIG. 3).

If the comparator 34 has ascertained the two codes "S" and "E", bit register 36 holds 4 bit data (viz., B9, B10 of the character "S" and B9, B10 of the following character "E") as above mentioned. For the convenience of descriptions, the bits B9, B10 of the character "S" are respectively depicted as B9', B10', while the bits B9, B10 of the character "E" are depicted as B9", B10", as shown in FIGS. 1 and 4.

Subsequently, the FIG. 1 arrangement continues to acquire the following two codes "T" and "CR". In the event that the comparator 34 ascertains that these two codes are correct, the character counter 38 counts up the reception of the four (4) characters. Viz., the four characters "S", "E", "T" and "CR" have been acquired by the FIG. 1 arrangement. Following this, the character counter 38 issues a command receive completion signal 44 which is applied to a decoder 46. Further, the signal 44 is also applied to a circuit (not shown) provided externally of the FIG. 1 arrangement, which circuit is arranged to respond to the signal 44 and detect a data format according to the bit combinations of B10", B]", B10' and B9' appearing over lines 50, 52, 54 and 56, respectively.

The reason why the signal 44 is generated after ascertaining that the four characters "S", "E", "T" and "CR" are correctly received, is to avoid any possibility that the FIG. 1 arrangement erroneously issues the bit combinations for use in detection of a data format in accordance with the characters "S" and "E" not involved in the command signal.

Reference is made to FIG. 4, wherein there are shown 16 possible bit combinations of B10", B9", B10' and B9' together with 9 possible data formats. It is understood that each of the bit combinations No. 1 to No. 7 is able to specify the corresponding data format as shown, while each of the bit combinations No. 8 to No. 16 are impossible bit combinations. By way of example, in the event that the No. 2 combination is stored in the bit register 36, the data bit length should be eight (8) and the parity bit is odd while the stop length is one bit.

In FIG. 1, in the event that any of the impossible combinations occurs, the decoder 46 detects same and resets the blocks the blocks 12, 26, 34, 36 and 38.

In the foregoing discussion, it has been assumed that the character length is 11-bit, but, the present invention is not restricted thereto and is applicable to 9 and 10-bit lengths as well. Generally, if the character length is L-bit, then the bit register 36 stores (L−2)-bit and (L−1)-bit of the characters "S" and "E".

It will be understood that the above disclosure is representative of only one possible embodiment of the present invention and that the concept on which the invention is based is not specifically limited thereto.

What is claimed is:

1. A hardware arrangement for obtaining a bit combination indicative of a format of asynchronously, serially transmitted data characters using a command signal, said command signal including a plurality of command characters which are serially transmitted and whose number is N (a positive integer exceeding three), the beginning of each of the command characters being identified by a start bit, the number of bits of each of said command characters being L (a positive integer), said hardware arrangement comprising:

first means for sequentially receiving said command characters and converting, in synchronism with a first train of pulses, each of said command characters into a corresponding parallel command character;

second means for counting pulses of said first train of pulses corresponding to bits of received characters and issuing a first signal when counting up to L;

third means responsive to said first signal from said second means for checking to determine if each of said parallel command characters from said first means corresponds with a predetermined character, said third means issuing a second signal if failing to ascertain each of said parallel command characters;

fourth means responsive to said first signal from said second means for counting command characters and issuing a second signal upon counting to N; and fifth means connected to said first means and responsive to said first signal from said second means for storing, as said bit combination, predetermined two bits of each of first two characters of said command characters from said first means, said second signal from said third means resetting said second, third, fourth, and fifth means.

2. A hardware arrangement as claimed in claim 1 further comprising sixth means for receiving said command and issuing a clock pulse when a start bit is detected.

3. A hardware arrangement as claimed in claim 2 wherein said sixth means comprises:

a start bit detector which receives said command characters and a second train of pulses having a repetition rate that is faster than said first train of pulses, said start bit detector issuing an output when detecting said start bit using said second train of pulses, said start bit detector being reset by said first signal; and a frequency demultiplier arranged to issue said first train of pulses using said second train of pulses in response to the output of said start bit detector.

4. A hardware arrangement as claimed in claim 1 wherein L is 9.

5. A hardware arrangement as claimed in claim 1 wherein L is 10.

6. A hardware arrangement as claimed in claim 1 wherein L is 11.

7. A hardware arrangement as claimed in claim 1 wherein said predetermined two bits are $(L-2)$th and $(L-1)$th bits counted from a stop bit which is positioned at Lth bit from a start bit.

* * * * *